United States Patent
Ueda et al.

(10) Patent No.: US 7,380,448 B2
(45) Date of Patent: Jun. 3, 2008

(54) MALFUNCTION DETECTION APPARATUS FOR PRESSURE SENSOR

(75) Inventors: Kuniaki Ueda, Obu (JP); Yasuo Sagisaka, Komaki (JP); Masahiko Yamaguchi, Obu (JP); Yasuo Mukai, Obu (JP)

(73) Assignee: DENSO Corporation, Kariya (JP)

( * ) Notice: Subject to any disclaimer, the term of this patent is extended or adjusted under 35 U.S.C. 154(b) by 46 days.

(21) Appl. No.: 11/447,036

(22) Filed: Jun. 6, 2006

(65) Prior Publication Data
US 2006/0277907 A1 Dec. 14, 2006

(30) Foreign Application Priority Data
Jun. 9, 2005 (JP) ............ 2005-168986
Jun. 14, 2005 (JP) ............ 2005-173148

(51) Int. Cl.
G01M 15/00 (2006.01)
(52) U.S. Cl. .................. 73/118.2
(58) Field of Classification Search .......... 73/115, 73/116, 117.2, 117.3, 118.1, 118.2, 119 R
See application file for complete search history.

(56) References Cited

U.S. PATENT DOCUMENTS

| | | | |
|---|---|---|---|
| 5,251,599 A | | 10/1993 | Ohuchi et al. |
| 5,698,780 A | * | 12/1997 | Mizutani et al. ......... 73/118.2 |
| 6,659,095 B2 | * | 12/2003 | Kotwicki et al. ......... 123/690 |
| 7,197,917 B2 | * | 4/2007 | Hasegawa ............ 73/118.1 |
| 7,203,594 B2 | * | 4/2007 | Hasegawa ............ 701/114 |
| 7,243,021 B2 | * | 7/2007 | Hasegawa ............ 701/114 |
| 7,263,427 B2 | * | 8/2007 | Hasegawa et al. ......... 701/107 |
| 2004/0020282 A1 | * | 2/2004 | Denz et al. ............ 73/118.1 |
| 2006/0179926 A1 | * | 8/2006 | Hasegawa ............ 73/73 |
| 2006/0184308 A1 | * | 8/2006 | Hasegawa et al. ......... 701/114 |
| 2006/0184310 A1 | * | 8/2006 | Hasegawa ............ 701/114 |
| 2006/0229798 A1 | * | 10/2006 | Fukuzawa ............ 701/114 |

FOREIGN PATENT DOCUMENTS

JP 60-004838 1/1985
JP 1-310149 12/1989

* cited by examiner

*Primary Examiner*—Eric S McCall
(74) *Attorney, Agent, or Firm*—Nixon & Vanderhye P.C.

(57) ABSTRACT

A malfunction detection apparatus is disclosed for a forced induction system. The system includes a compressor provided on an upstream side of a throttle valve in an intake passage of an engine, an upstream intake pressure sensor that detects intake pressure between the compressor and the throttle valve, and an atmospheric pressure sensor that detects atmospheric pressure. The malfunction detection apparatus includes a malfunction detection program that makes a comparison between the atmospheric pressure detected by the atmospheric pressure sensor and the upstream intake pressure detected by the upstream intake pressure sensor. The comparison is made in an operating state of the forced induction system in which the compressor compresses an amount of air that is approximately equal to or less than a predetermined amount to thereby determine whether the upstream pressure sensor has a malfunction.

18 Claims, 3 Drawing Sheets

MALFUNCTION DETECTION APPARATUS FOR PRESSURE SENSOR

CROSS REFERENCE TO RELATED APPLICATION

This application is based upon and claims the benefit of priority of Japanese Patent Application No. 2005-168986 filed on Jun. 9, 2005, and Japanese Patent Application No. 2005-173148 filed on Jun. 14, 2005, the content each of which are incorporated herein by reference.

FIELD OF THE INVENTION

The following generally relates to a malfunction detection apparatus and, more specifically, relates to a malfunction detection apparatus for a pressure sensor.

BACKGROUND OF THE INVENTION

Generally, engines with forced induction systems include a turbocharger or a supercharger with a compressor disposed upstream of a throttle. The compressor compresses intake air, and the compressed air moves toward the throttle. These systems often include an upstream intake pressure sensor provided between the compressor and the throttle valve to detect a charging pressure (i.e., the intake pressure between the compressor and the throttle valve).

Japanese Patent No. 2632368 describes a device for detecting a malfunction of the upstream intake pressure sensor. The device includes an upstream intake pressure sensor (upstream of the throttle valve) and a downstream intake pressure sensor (downstream of the throttle valve). If the upstream intake pressure sensor is functioning properly, the pressure upstream of the throttle valve should remain higher than the pressure downstream of the throttle valve. However, malfunction of the upstream intake pressure sensor is detected if the pressure downstream of the throttle valve is detected higher than the pressure upstream of the throttle valve.

However, the device described in Japanese Patent No. 2632368 may inaccurately or unreliably detect malfunction of the upstream intake pressure sensor. More specifically, even if the upstream intake pressure sensor is malfunctioning, the malfunction may not be detected if the upstream intake pressure sensor is outputting inaccurately high pressure signals.

Furthermore, another device for detecting a malfunction of an upstream intake pressure sensor is disclosed in JP-A-60-4838. More specifically, the device includes a low pressure intake pressure sensor for detecting low pressure and a high pressure intake pressure sensor for detecting high pressure. A malfunction of the low pressure intake pressure sensor is detected when a detected value VPBNA of the low pressure intake pressure sensor is higher than a judgment value VPBNAH and when a detected value VPBTC of the high pressure intake pressure sensor is lower than a set value VPBTC17. A malfunction of the high pressure intake pressure sensor is detected where a detected value VPBTC of the intake pressure sensor for high pressure is lower than a judgment value VPBTCL and when a detected value VPBNA of the intake pressure sensor for low pressure is higher than a set value VPBNA17.

However, the device described in JP-A-60-4838 may be inaccurate or unreliable because malfunction of one of the sensors is detected based on the other sensor. More specifically, if one of the sensors malfunctions, the other sensor may be improperly identified as the malfunctioning sensor.

SUMMARY OF THE INVENTION

A malfunction detection apparatus is disclosed for a forced induction system. The system includes a compressor provided on an upstream side of a throttle valve in an intake passage of an engine, an upstream intake pressure sensor that detects intake pressure between the compressor and the throttle valve, and an atmospheric pressure sensor that detects atmospheric pressure. The malfunction detection apparatus includes a malfunction detection program that makes a comparison between the atmospheric pressure detected by the atmospheric pressure sensor and the upstream intake pressure detected by the upstream intake pressure sensor. The comparison is made in an operating state of the forced induction system in which the compressor compresses an amount of air that is approximately equal to or less than a predetermined amount to thereby determine whether the upstream pressure sensor has a malfunction.

Furthermore, a malfunction detection apparatus is disclosed for a system that includes an engine, a first intake pressure sensor, a second intake pressure sensor, and an atmospheric pressure sensor for detection of atmospheric pressure. The malfunction detection apparatus includes a malfunction detection program that makes a comparison among a plurality of pressure values. The plurality of pressure values include a first pressure value detected by the first intake pressure sensor, a second pressure value detected by the second intake pressure sensor, and an atmospheric pressure value detected by the atmospheric pressure sensor. The comparison is performed to thereby determine whether one of the first intake pressure sensor, the second intake pressure sensor, and the atmospheric pressure sensor has a malfunction.

In addition, a method is disclosed for detecting a malfunction in a forced induction system with a compressor provided on an upstream side of a throttle valve in an intake passage of an engine, an upstream intake pressure sensor that detects intake pressure between the compressor and the throttle valve, and an atmospheric pressure sensor that detects atmospheric pressure. The method includes comparing an atmospheric pressure value detected by the atmospheric pressure sensor to an upstream intake pressure value detected by the upstream intake pressure sensor. The comparing is done in an operating state of the forced induction system in which the compressor compresses an amount of air that is approximately equal to or less than a predetermined amount to thereby determine whether the upstream pressure sensor has a malfunction.

Still further, a method is disclosed for detecting a malfunction in a system having an engine, a first intake pressure sensor, a second intake pressure sensor, and an atmospheric pressure sensor for detection of atmospheric pressure. The method includes comparing among a plurality of pressure values. The pressure values include a first pressure value detected by the first intake pressure sensor, a second pressure value detected by the second intake pressure sensor, and an atmospheric pressure value detected by the atmospheric pressure sensor. The comparison is performed to thereby determine whether one of the first intake pressure sensor, the second intake pressure sensor, and the atmospheric pressure sensor has a malfunction.

DETAILED DESCRIPTION OF EMBODIMENT(S)

Figure 1:
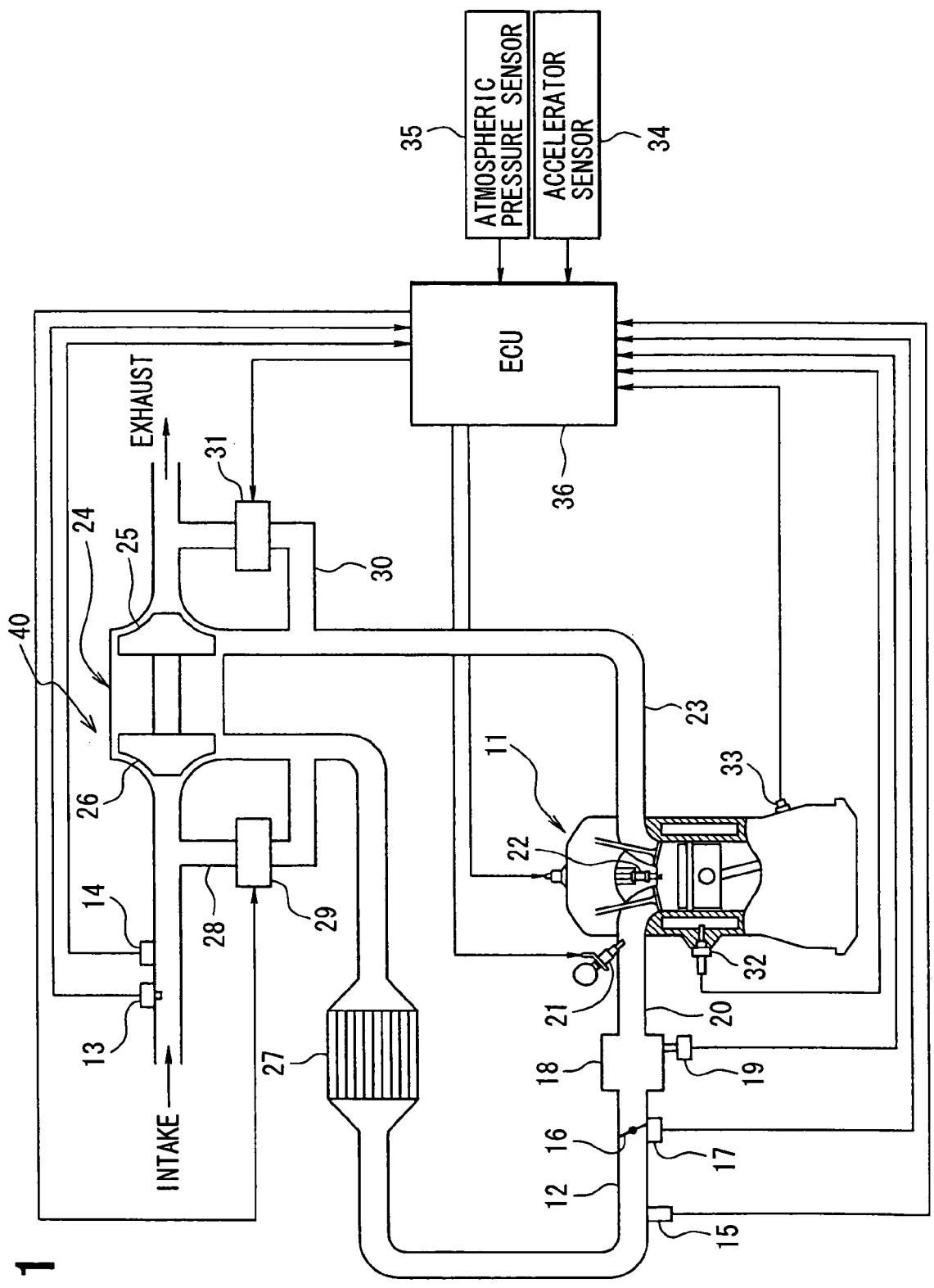
FIG. 1 is a view showing a schematic construction of an engine control system according to an embodiment of the invention.

Referring initially to FIG. 1, a schematic construction of an engine control system is illustrated. An air cleaner (not shown) is provided in an upstream portion of an intake pipe 12 (intake passage) of an engine 11, such as an internal combustion engine. Also provided on a downstream side of the air cleaner is an air flow meter 13 for detection of the quantity of intake air. An intake temperature sensor 14 for detection of intake temperature is provided downstream of the air cleaner.

Provided on a downstream side of the air flow meter 13 and the intake temperature sensor 14 is a compressor 26 of a forced induction system 40. In the embodiment shown, the forced induction system 40 is an exhaust turbine drive type turbocharger 24 as will be described in greater detail below; however, the forced induction system 40 could include a supercharger (i.e., be driven by the engine 11) without departing from the scope of the invention.

An intercooler 27 is also provided downstream of the air flow meter 13 and the intake temperature sensor 14. The intercooler 27 is used for cooling the intake air compressed by the compressor 26. Furthermore, provided on a downstream side of the intercooler 27 is an upstream side intake pressure sensor 15 for detection of intake pressure (i.e., charging pressure) on an upstream side of a throttle valve 16. An intake temperature sensor may be provided. The intake temperature sensor may be integral with the upstream intake pressure sensor 15 in one embodiment.

Provided on a downstream side of the upstream intake pressure sensor 15 is a throttle valve 16, which is movably mounted to the intake pipe 12 such that the opening angle of the throttle valve 16 can be adjusted by a motor, etc. A throttle opening angle sensor 17 is also provided for detection of the opening angle of the throttle valve 16 (i.e., the throttle opening angle).

Further, a surge tank 18 is provided on a downstream side of the throttle valve 16, and a downstream intake pressure sensor 19 is provided on the surge tank 18 to detect an intake pressure on the downstream side of the throttle valve 16. Also, the surge tank 18 is provided with an intake manifold 20, through which air is introduced into respective cylinders of the engine 11. Moreover, respective fuel injection valves 21 are provided adjacent intake ports of respective cylinders on the intake manifold 20. Also, ignition plugs 22 are included for every cylinder of the engine 11. The ignition plugs 22 provide a spark for igniting the fuel/air mixture within the respective cylinder of the engine 11.

As stated above, an exhaust turbine drive type turbocharger 24 is included. The turbocharger 24 comprises an exhaust turbine 25 in communication with an exhaust pipe 23. The compressor 26 is arranged between the air flow meter 13 and the throttle valve 16. The turbocharger 24 is constructed so that the exhaust turbine 25 and the compressor 26 are connected to each other and the kinetic energy of exhaust gases rotationally drives the exhaust turbine 25 to thereby rotationally drive the compressor 26. As a result, the compressor 26 compresses (i.e., pressurizes) the intake air.

Further, the intake pipe 12 includes an intake bypass passage 28, through which air can bypass the compressor 26. An air bypass valve 29 is provided midway in the intake bypass passage 28 for opening and closing the intake bypass passage 28. In addition, the exhaust pipe 23 is provided with an exhaust bypass passage 30, through which exhaust gas can bypass the exhaust turbine 25. A waste gate valve 31 is provided midway in the exhaust bypass passage 30 for opening and closing the exhaust bypass passage 30.

Also, the engine 11 includes a cooling water temperature sensor 32 for detection of a cooling water temperature. A crank angle sensor 33 is also included. The crank angle sensor 33 outputs a pulse signal each time a crankshaft of the engine 11 rotates a predetermined amount. As such, a crank angle and an engine speed can be detected on the basis of the output signal of the crank angle sensor 33. Also, an accelerator sensor 34 is included for detecting a stepped amount (i.e., accelerator opening degree) of an accelerator pedal. An atmospheric pressure sensor 35 is further included for detecting the atmospheric pressure. In one embodiment, the atmospheric pressure sensor 35 is arranged in a casing of an ECU 36, which will be described in greater detail below.

Outputs of the various sensors described above are input into an engine control circuit (hereinafter "ECU") 36. The ECU 36 is composed of a microcomputer and executes various engine control programs stored in a built-in ROM (i.e., storage medium) to control fuel injection quantities of the fuel injection valves 21 and ignition timing of the ignition plugs 22 according to an engine operating state.

Figure 2:
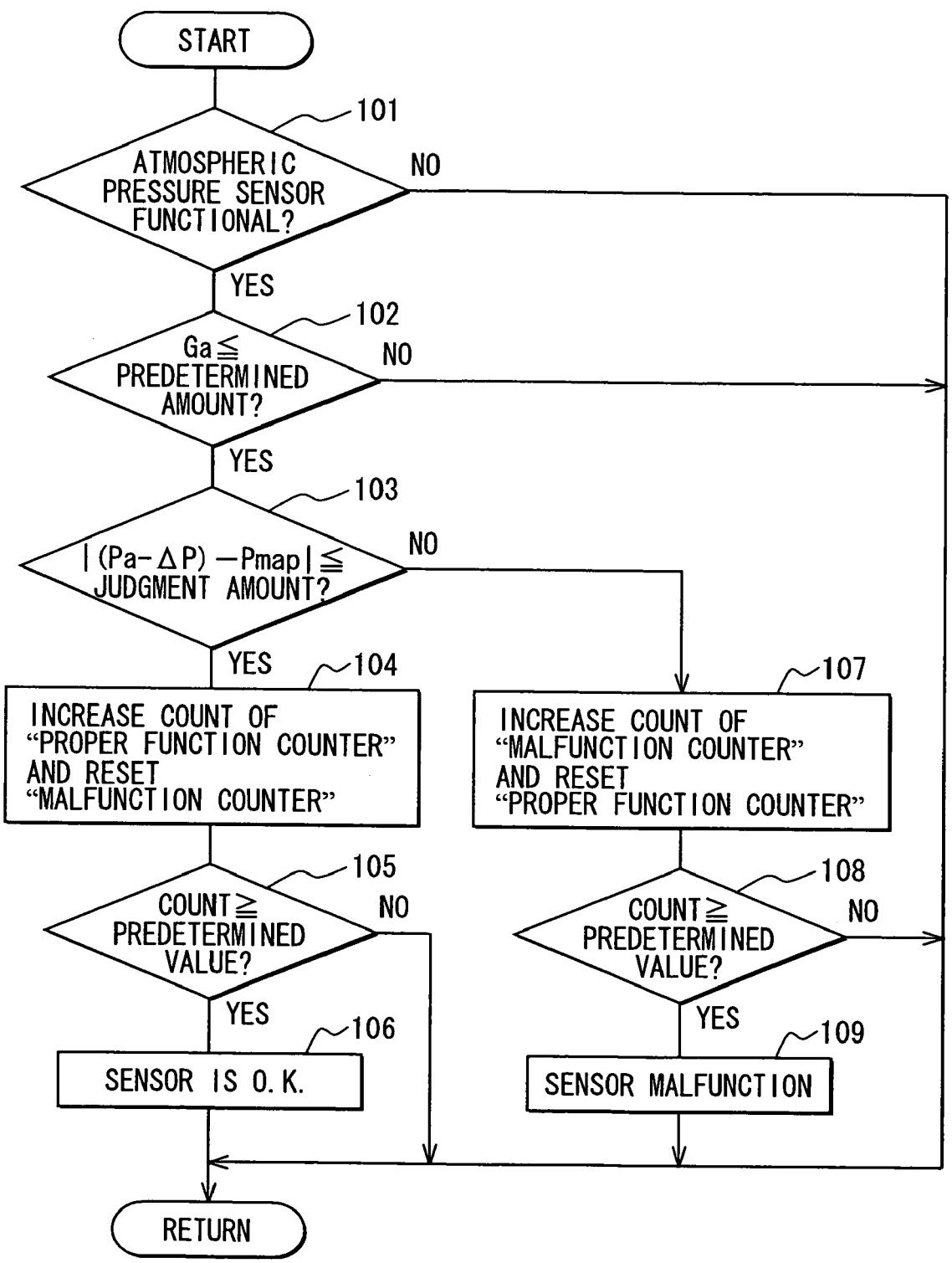
FIG. 2 is a flowchart illustrating the operation of an upstream side intake pressure sensor malfunction detection program.

Also, the ECU 36 executes an upstream side intake pressure sensor malfunction detection program, which is illustrated in FIG. 2 and will be described in greater detail below. Generally, the malfunction detection program is used for comparing a detected value Pa (i.e., the atmospheric pressure detected by the atmospheric pressure sensor 35) and a detected value Pmap (i.e., an intake pressure on the upstream side of the throttle valve 16 detected by the upstream intake pressure sensor 15). The malfunction detection program is executed in a low-load operating state of the forced induction system 40 (i.e., an operating state in which the intake air quantity Ga detected by the air flow meter 13 is equal to or less than a predetermined value). In other words, the comparison between Pa and Pmap is conducted when the compressor 26 compresses relatively little intake air. Also, in one embodiment, the comparison is conducted when the amount of intake air compressed by the compressor 26 is approximately zero.

As will be explained, this comparison is conducted in order to detect whether or not the upstream intake pressure sensor 15 is malfunctioning. More specifically, in a low-load operating state, in which relatively low amounts of intake air is compressed by the compressor 26, the intake pressure on the upstream side of the throttle valve 16 approaches substantially the atmospheric pressure. In other words, at these operating conditions, the detected value Pa and the detected value Pmap become substantially equal to each other, assuming that the upstream intake pressure sensor 15 is functioning normally. Thus, it can be determined whether or not the upstream intake pressure sensor 15 is malfunctioning by comparing the detected value Pa and the detected value Pmap at a low-load operating state of the forced induction system 40.

Referring now to FIG. 2, the upstream side intake pressure sensor malfunction detection executed by the ECU 36 will be explained.

The malfunction detection program shown in FIG. 2 is executed in a predetermined cycle while the ECU 36 is energized. When the program is started, it is first determined in STEP 101 whether or not the atmospheric pressure sensor 35 is functioning properly. In one embodiment, STEP 101 involves detecting the atmospheric pressure detected with the atmospheric pressure sensor 35, the upstream intake pressure with the upstream intake pressure sensor 15, and the downstream intake pressure with the downstream intake pressure sensor 19, for example, when the engine is stopped. In such a case, the atmospheric pressure, the upstream intake pressure, and the downstream intake pressure should be approximately equal (i.e., the pressures upstream and downstream of the throttle valve 16 should be approximately equal to the atmospheric pressure). If the three pressures are not approximately equal, it is determined in STEP 101 that the atmospheric pressure sensor 35 is not functional (i.e., is malfunctioning), and vice versa. It will be appreciated, however, that the determination in STEP 101 could be made in any suitable manner.

In the case where it is determined in STEP 101 that the atmospheric pressure sensor 35 is not functional, the malfunction detection program is terminated. On the other hand, where it is determined in STEP 101 that the atmospheric pressure sensor 35 is functional, the program continues to STEP 102.

In STEP 102, it is determined whether the intake air quantity, Ga, is less than or approximately equal to a predetermined amount. If an affirmative determination is made in STEP 102, the program continues to STEP 103; however, if a negative determination is made in STEP 102, the program is terminated. In one embodiment, the "predetermined amount" is a relatively low value, and as such, the program continues to STEP 103 only in low-load operating states of the forced induction system (i.e., where the compressor 26 is compressing little to no air).

In STEP 103, a comparison is made between the atmospheric pressure, Pa, detected by the atmospheric pressure sensor 35 and the upstream intake pressure, Pmap, detected by the upstream intake pressure sensor 15. In essence, it is determined whether the intake pressure, Pma, is substantially equal to the atmospheric pressure, Pa, detected by the atmospheric pressure sensor 35.

In the embodiment shown in FIG. 2, STEP 103 further includes taking account of intake pressure losses on the upstream side of the throttle valve. Specifically, a pressure loss, $\Delta P$, is taken into account. In one embodiment, the pressure loss, $\Delta P$, is caused by the intercooler 27, and the pressure loss, $\Delta P$, is a preset, fixed value or is determined based on an operating state of the vehicle (e.g., engine speed, intake air quantity, etc.). It will be appreciated that the pressure loss can be a result of any component other than the intercooler 27, and that the value of the pressure loss, $\Delta P$, can be determined in any suitable manner.

Thus, in STEP 103, a calculation is performed. Specifically, $\Delta P$ is subtracted from the atmospheric pressure, Pa, the intake pressure Pmap is subtracted therefrom, and an absolute value is taken of the result. If the absolute value of the result is less than or equal to a predetermined judgment amount, STEP 103 results in an affirmative determination, and the program proceeds to STEP 104. If the absolute value of the result is more than the predetermined judgment amount, STEP 103 results in a negative determination, and the program proceeds to step 107.

It will be appreciated that the "predetermined judgment amount" shown in STEP 103 could be any suitable value, such as a relatively low value to account for error, etc. As such, it will be determined that the intake pressure sensor 15 is functioning properly even if there is a slight difference between (Pa−$\Delta P$) and Pmap.

After an affirmative determination in STEP 103, STEP 104 involves increasing the count of a "proper function counter" and resetting the count of a "malfunction counter" to zero. The "proper function counter" is a record of the amount of times that the intake pressure sensor 15 has been detected to be functioning properly, and the "malfunction counter" is a record of the amount of times that the intake pressure sensor 15 has been detected to be malfunctioning.

Then, in STEP 105, it is determined whether the count of the "proper function counter" is greater than or equal to a predetermined value. The predetermined value of STEP 105 can be any suitable value, and can allow for redundant confirmation that the intake pressure sensor 15 is functioning properly. If the count of the "proper function counter" is less than the predetermined value, then the program returns to the beginning. If the count of the "proper function counter" is greater than or equal to the predetermined value, then it is determined in STEP 106 that the intake pressure sensor 15 is functioning properly, and the program terminates.

However, if a negative determination is made in STEP 103, the program proceeds to STEP 107, in the count of the "malfunction counter" is increased, and the count of the "proper function counter" is reset to zero. Then, in STEP 108, it is determined whether the count of the "malfunction counter" is greater than or equal to a predetermined value. The predetermined value of STEP 108 can be any suitable value, and can allow for redundant confirmation that the intake pressure sensor 15 is malfunctioning. If the count of the "malfunction counter" is less than the predetermined value, then the program returns to the beginning. If the count of the "malfunction counter" is greater than or equal to the predetermined value, then it is determined in STEP 109 that the intake pressure sensor 15 is malfunctioning, and the program terminates.

In one embodiment, when it is determined in STEP 109 that the intake pressure sensor 15 is malfunctioning, an alarm (not shown) is activated to notify a user of the malfunction. The alarm can be of any suitable type, such as a lamp that can be illuminated and/or a speaker that can emit a sound. Also, when a malfunction is determined in STEP 109, malfunction information (e.g., malfunction code, etc.) is stored for future reference. For instance, in one embodiment, the malfunction information is stored on a rewritable nonvolatile memory such as a backup RAM (not shown) of the ECU 36.

Thus, according to the embodiment described above, it is possible to accurately diagnose whether or not the intake pressure sensor 15 is functioning properly.

In another embodiment, STEP 103 of the program is different from that shown in FIG. 2. More specifically, the pressure loss value, $\Delta P$, is added to the intake pressure value, Pmap, and that result is compared to the atmospheric pressure value, Pa, to see whether the values are approximately equal to each other. In another embodiment, STEP 103 includes finding a difference between the intake pressure value, Pmap, and the atmospheric pressure value, Pa, and determining whether that difference is approximately equal to the pressure loss value, $\Delta P$. In still another embodiment, the pressure loss value, $\Delta P$, is not taken into account (for instance, when the pressure loss value, $\Delta P$, is relatively small), and STEP 103 involves determining whether the intake pressure value, Pmap, is substantially equal to the atmospheric pressure value, Pa, are substantially equal.

Further, as explained above, it is determined whether or not the atmospheric pressure sensor 35 is malfunctioning before it is determined whether or not the intake pressure sensor 15 is malfunctioning. Thus, it is possible to avoid inaccurate diagnosis of the intake pressure sensor 15 due to a malfunctioning atmospheric pressure sensor 35. As such, the diagnosis of the intake pressure sensor 15 is more reliable.

Furthermore, the embodiment of FIG. 2 may be used in association with an engine 11 having a supercharger (e.g., an engine-driven supercharger), rather than the turbocharger 24 shown in FIG. 1.

Figure 3A:
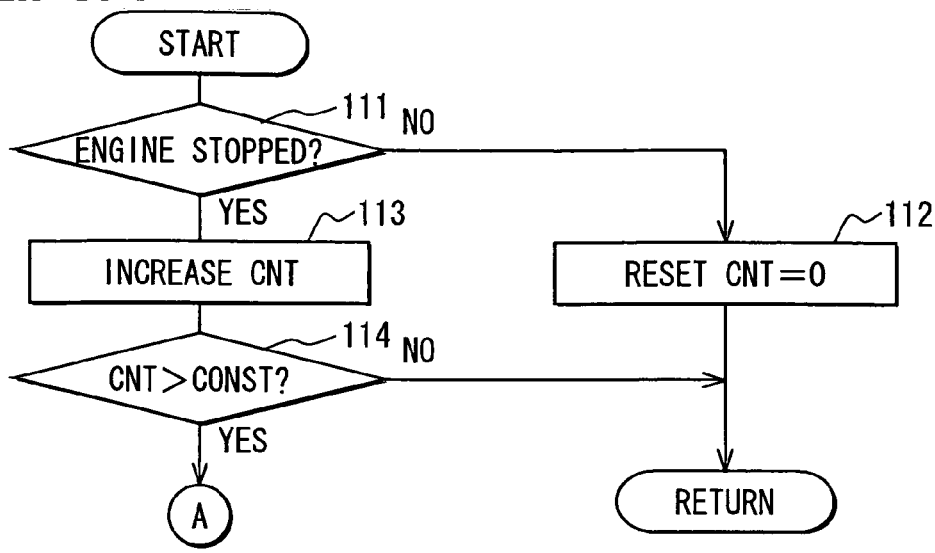
FIGS. 3A and 3B are portions of a flowchart illustrating another embodiment of a pressure sensor malfunction detection program.
Figure 3B:
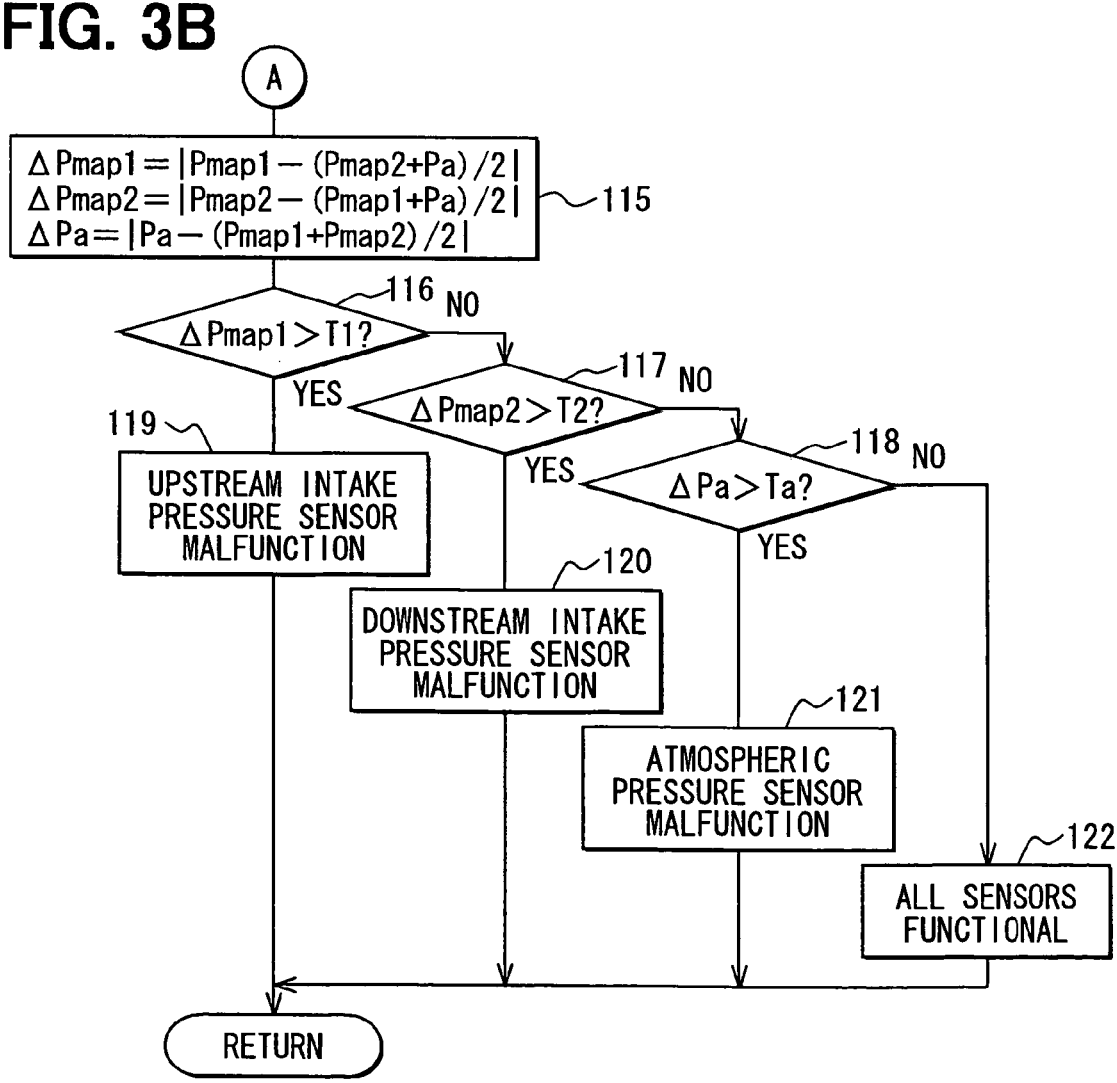

Referring now to FIGS. 3A and 3B, another embodiment of the pressure sensor malfunction detection program is illustrated. The program can be employed in a system similar to that of FIG. 1. The ECU 36 causes the program to be performed. It will be appreciated that a single vehicle could perform the program of FIGS. 3A and 3B in addition to the program of FIG. 2. It will also be appreciated that the program of FIGS. 3A and 3B could be performed independent of the program of FIG. 2.

Generally, the pressure sensor malfunction detection program is executed to determine whether a malfunction exists for one or more of the upstream intake pressure sensor 15, the downstream intake pressure sensor 19, and the atmospheric pressure sensor 35. More specifically, a comparison is made of an upstream pressure value, Pmap1, detected by the upstream intake pressure sensor 15, a downstream pressure value, Pmap2, detected by the downstream intake pressure sensor 19, and an atmospheric pressure value, Pa, detected by the atmospheric pressure sensor 35.

In one embodiment, the respective pressure values are detected simultaneously by the pressure sensors 15, 19, 35 and agreement/disagreement among these detected values is determined during stoppage of the engine 11. In this embodiment, an electric current is supplied for a suitable amount of time to the ECU 36 while the ignition switch (not shown) is in an OFF position.

Since pressure in the intake pipe 12 is substantially equal to the atmospheric pressure during stoppage of the engine 11, the pressure values detected by the upstream intake pressure sensor 15, the downstream intake pressure sensor 19, and the atmospheric pressure sensor 35 should be approximately equal to each other, assuming each pressure sensor 15, 19, 35 are functioning properly. However, if one of the pressure sensors 15, 19, 35 is malfunctioning, one of the detected pressure values will be substantially different than the other two detected pressure values. Thus, the pressure sensor 15, 19, 35 that outputs a pressure value substantially different from the other two pressure sensors 15, 19, 35 is detected as the malfunctioning pressure sensor 15, 19, 35.

The malfunction detection program shown in FIGS. 3A and 3B is executed in a predetermined cycle while a current is supplied to the ECU 36. The program begins in STEP 111, in which it is determined whether the engine 11 is stopped. In one embodiment, the determination of STEP 111 is made based on the position of the ignition switch. If the ignition switch is in an ON position (i.e., the engine is operating), a negative determination is made, and the program proceeds to STEP 112. If the ignition switch is in an OFF position, the program proceeds to STEP 113.

In STEP 112, an counter value "CNT" is reset to zero, and then the program terminates. As will explained below, the counter value "Cnt" is used to determine how long the engine has been stopped.

In STEP 113, the counter value "CNT" referred to above is increased. Then, the program proceeds to STEP 114 to determine whether the counter value "CNT" exceeds a predetermined value "CONST." If the counter value "CNT" is less than the predetermined value "CONST," the program terminates. However, if the "CNT" is greater than the predetermined value "CONST," the program continues, and pressure values are detected respectively by the pressure sensors 15, 19, 35 as will be explained below in reference to FIG. 3B.

The predetermined value "CONST" can be of any suitable value. It will be appreciated the malfunction detection program may be more accurate after the engine 11 has been stopped for a predetermined amount of time. (In other words, the pressure values output by pressure sensors 15, 19, 35 may remain dissimilar for a short time after the engine has been stopped.) Thus, STEPS 111-114 ensure more accurate detection, allowing for detection of the pressure values after a predetermined time after the engine has been stopped.

Next in STEP 115 (FIG. 3B), a majority operation begins. More specifically, a comparison is made among the intake pressure value, Tmap1, detected by the upstream intake pressure sensor 15, the intake pressure value, Tmap2, detected by the downstream intake pressure sensor 19, and the atmospheric pressure value, Pa, detected by the atmospheric pressure sensor 35. The comparison is made to determine whether the three pressure values are substantially the same or whether any of the pressure values are substantially different.

In the embodiment shown, the majority operation includes calculating deviations (i.e., degree of deviation) for the pressure values Pmap1, Pmap2, and Pa. These deviations are expressed in FIG. 3B as ΔPmap1, ΔPmap2, and ΔPa, respectively. Specifically, the deviations are calculated by finding an absolute value of the difference between one pressure value and the average value of the other two pressure values. Thus:

$$\Delta Pmap1 = |Pmap1 - (Pmap2+Pa)/2|$$

$$\Delta Pmap2 = |Pmap2 - (Pmap1+Pa)/2|$$

$$\Delta Pa = |Pa - (Pmap1+Pmap2)/2|$$

Thereafter, the program proceeds to STEP 116 to determine whether the upstream intake deviation, ΔPmap1, is larger than a predetermined judgment value, T1, which is set according to an allowable detection error of the upstream intake pressure sensor 15. If the deviation ΔPmap1 is larger than the predetermined judgment value T1, it is determined that the detected pressure value, Pmap1, of the upstream intake pressure sensor 15 is substantially different from the other two detected pressure values, Pmap2, Pa. As a result, the program proceeds to STEP 119 to determine that the upstream intake pressure sensor 15 has a malfunction. Then, the program terminates.

In contrast, where the deviation ΔPmap1 is equal to or less than the judgment value, T1, in STEP 116, the program proceeds to STEP 117 to determine whether the downstream intake deviation ΔPmap2 is larger than a predetermined judgment value, T2, which is set according to an allowable detection error of the downstream intake pressure sensor 19. If the deviation ΔPmap2 is larger than the predetermined judgment value T2, it is determined that the detected pressure value, Pmap2, of the downstream intake pressure sensor 19 is substantially different from the other two detected pressure values, Pmap1, Pa. As a result, the program proceeds to STEP 120 to determine that the downstream intake pressure sensor 19 has a malfunction. Then, the program terminates.

In contrast, where the deviation ΔPmap2 is equal to or less than the judgment value T2, in STEP 117, the procedure proceeds to STEP 118 to determine whether the atmospheric deviation ΔPa is larger than a predetermined judgment value, Ta, which is set according to an allowable detection error of the atmospheric pressure sensor 35. If the deviation ΔPa is larger than the predetermined judgment value Ta, it is determined that the detected atmospheric pressure, Pa, detected by the atmospheric pressure sensor 35 is substantially different from the other two detected pressure values, Pmap1, Pmap2. As a result, the program proceeds to STEP 121 to determine that the atmospheric pressure sensor 35 has a malfunction.

In contrast, where the deviation ΔPa is equal to or less than the judgment value Ta, the program proceeds to STEP 122, where it is determined that each of the pressure sensors 15, 19, 35 are functioning properly, and the program then terminates. In other words, the program has determined that the detected pressure values Pmap1, Pmap2, and Pa are substantially the same (i.e. the values agree with each other), and it can be determined that the pressure sensors 15, 19, 35 are functioning properly.

Thus, the present embodiment relies upon the fact that the pressure in the intake pipe 12 should become substantially equal to the atmospheric pressure when the engine 11 is stopped. To detect a malfunction of one of the pressure sensors 15, 19, 35, a majority operation is performed, in which a comparison is made among the detected value Pmap1 of the upstream intake pressure sensor 15, the detected value Pmap2 of the downstream intake pressure sensor 19, and the detected value Pa of the atmospheric pressure sensor 35 during stoppage of the engine 11. It is determined whether any of these detected values are substantially different from the others. As such, it is possible to accurately determine whether or not any of the pressure sensors 15, 19, 35 has a malfunction. Thus, in the case where one or more pressure sensors 15, 19, 35 is malfunctioning, it is possible to identify the malfuntion(s).

Also, according to the present embodiment, when the majority operation is performed, depending upon whether a deviation is greater than its corresponding judgment value, it is determined whether the corresponding detected pressure value disagrees with the other two detected pressure values, and a malfunction can be identified for one or more of the pressure sensors 15, 19, 35. As such, it is possible to simply and accurately identify the sensor(s) with a malfunction by means of the majority operation.

Also, according to the present embodiment, since the pressure values Pmap1, Pmap2, Pa, are detected after the engine 11 has been stopped for a predetermined amount of time, malfunction detection can be more reliable. In another embodiment, the pressure values Pmap1, Pmap2, Pa are detected when the engine 11 is started. For example, the pressure values Pmap1, Pmap2, Pa are detected immediately after the ignition switch is turned to an ON position. It will be appreciated that at the start of the engine 11, the engine 11 not yet rotating or is rotating relatively slowly, and there is relatively little air intake. As such, the malfunction detection can be performed accurately and reliably at engine startup as well.

The majority operation may employ any suitable calculations. For instance, in one embodiment, a ratio of one of the detected pressure values (e.g., Pmap1) and an average of the other two detected pressure values (e.g., Pmap2, Pa) may be calculated. Then, it is determined whether or not the pressure values Pmap1, Pmap2, Pa are substantially different based upon whether the ratio is approximately equal to 1.

In another embodiment, a malfunction of one of the pressure sensors 15, 19, 35 is determined based on finding a difference between two of the pressure values, such as:

$$D1 = Pmap1 - Pmap2$$

Then, it is determined whether the difference, D1, is less than or equal to a predetermined judgment value. Other differences, D2, D3, are calculated using a different combination of the pressure values, such as:

$$D2 = Pmap1 - Pa$$

$$D3 = Pmap2 - Pa$$

Then it is determined whether the differences D2, D3 are less than or equal to respective predetermined judgment values. Next, it is determined whether one or more malfunctions exists based on these calculations.

Furthermore, the embodiment of FIGS. 3A and 3B may be used in association with an engine 11 having a supercharger (e.g., an engine-driven supercharger), rather than the turbocharger 24 shown in FIG. 1. The embodiment of FIGS. 3A and 3B may also be used in association with an engine 11 that has a natural intake, rather than the forced intake system 40 shown in FIG. 1 without departing from the scope of the present invention.

The present invention has been described in an illustrative manner. It is to be understood that the terminology, which has been used, is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A malfunction detection apparatus for a forced induction system comprising a compressor provided on an upstream side of a throttle valve in an intake passage of an engine, an upstream intake pressure sensor that detects intake pressure between the compressor and the throttle valve, and an atmospheric pressure sensor that detects atmospheric pressure, the malfunction detection apparatus comprising:
   a malfunction detection program that makes a comparison between the atmospheric pressure detected by the atmospheric pressure sensor and the upstream intake pressure detected by the upstream intake pressure sensor,
   wherein the comparison is made in an operating state of the forced induction system in which the compressor compresses an amount of air that is approximately equal to or less than a predetermined amount to thereby determine whether the upstream pressure sensor has a malfunction.

2. The malfunction detection apparatus according to claim 1, wherein the malfunction detection program makes the comparison taking account of an intake pressure loss on the upstream side of the throttle valve.

3. The malfunction detection apparatus according to claim 1, wherein the malfunction detection program further detects whether the atmospheric pressure sensor has a malfunction before making the comparison.

4. A malfunction detection apparatus for a system comprising an engine, a first intake pressure sensor, a second intake pressure sensor, and an atmospheric pressure sensor for detection of atmospheric pressure, the malfunction detection apparatus comprising:

a malfunction detection program that makes a comparison among a plurality of pressure values comprising a first pressure value detected by the first intake pressure sensor, a second pressure value detected by the second intake pressure sensor, and an atmospheric pressure value detected by the atmospheric pressure sensor, to thereby determine whether one of the first intake pressure sensor, the second intake pressure sensor, and the atmospheric pressure sensor has a malfunction.

5. The malfunction detection apparatus according to claim 4, wherein the comparison is made such that the malfunction is detected when one of the pressure values is substantially different from the other pressure values, and such that the one of the first pressure sensor, the second pressure sensor, and the atmospheric pressure sensor that output the pressure value substantially different from the other pressure values is identified as having the malfunction.

6. The malfunction detection apparatus according to claim 4, wherein the plurality of pressure values are detected while the engine is stopped.

7. The malfunction detection apparatus according to claim 6, wherein the plurality of pressure values are detected while the engine has been stopped for a predetermined time.

8. The malfunction detection apparatus according to claim 4, wherein the plurality of pressure values are detected when the engine is started.

9. The malfunction detection apparatus according to claim 4, wherein the system is a forced induction system comprising a compressor provided on an upstream side of a throttle valve in an intake passage of the engine, wherein the first intake pressure sensor detects an intake pressure between the compressor and the throttle valve, and the second intake pressure sensor detects an intake pressure on a downstream side of the throttle valve.

10. A method of detecting a malfunction in a forced induction system comprising a compressor provided on an upstream side of a throttle valve in an intake passage of an engine, an upstream intake pressure sensor that detects intake pressure between the compressor and the throttle valve, and an atmospheric pressure sensor that detects atmospheric pressure, the method comprising:

comparing an atmospheric pressure value detected by the atmospheric pressure sensor to an upstream intake pressure value detected by the upstream intake pressure sensor, wherein the comparing is done in an operating state of the forced induction system in which the compressor compresses an amount of air that is approximately equal to or less than a predetermined amount to thereby determine whether the upstream pressure sensor has a malfunction.

11. The method according to claim 10, wherein the comparing further comprises taking account of an intake pressure loss on the upstream side of the throttle valve.

12. The method according to claim 10, further comprising detecting whether the atmospheric pressure sensor has a malfunction before comparing the atmospheric pressure value to the upstream intake pressure value.

13. A method of detecting a malfunction in a system comprising an engine, a first intake pressure sensor, a second intake pressure sensor, and an atmospheric pressure sensor for detection of atmospheric pressure, the method comprising:

comparing among a plurality of pressure values comprising a first pressure value detected by the first intake pressure sensor, a second pressure value detected by the second intake pressure sensor, and an atmospheric pressure value detected by the atmospheric pressure sensor, to thereby determine whether one of the first intake pressure sensor, the second intake pressure sensor, and the atmospheric pressure sensor has a malfunction.

14. The method according to claim 13, wherein the comparing comprises:

detecting whether one of the pressure values is substantially different from the other pressure values; and identifying as having the malfunction one of the first intake pressure sensor, the second intake pressure sensor, and the atmospheric pressure sensor that output the pressure value substantially different from the other pressure values.

15. The method according to claim 13, further comprising detecting the plurality of pressure values while the engine is stopped.

16. The method according to claim 15, further comprising detecting the plurality of pressure values while the engine has been stopped for a predetermined time.

17. The method according to claim 13, further comprising detecting the plurality of pressure values when the engine is started.

18. The method according to claim 13, wherein the system is a forced induction system comprising a compressor provided on an upstream side of a throttle valve in an intake passage of the engine, wherein the first intake pressure sensor detects an intake pressure between the compressor and the throttle valve, and the second intake pressure sensor detects an intake pressure on a downstream side of the throttle valve.

* * * * *